(12) United States Patent
Sawada et al.

(10) Patent No.: US 7,251,055 B2
(45) Date of Patent: Jul. 31, 2007

(54) IMAGE FORMING APPARATUS HAVING A FUNCTION FOR CORRECTING COLOR DEVIATION AND THE LIKE

(75) Inventors: Kenichi Sawada, Toyohashi (JP); Junji Nishigaki, Toyokawa (JP); Keisuke Hashimoto, deceased, late of Kyoto (JP); by Fujio Hashimoto, legal representative, Kyoto (JP); by Nobue Hashimoto, legal representative, Kyoto (JP); Kentaro Katori, Toyokawa (JP); Yoshihiko Hirota, Toyokawa (JP); Tomoji Tanaka, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 1260 days.

(21) Appl. No.: 09/783,323

(22) Filed: Feb. 15, 2001

(65) Prior Publication Data

US 2001/0055120 A1 Dec. 27, 2001

(30) Foreign Application Priority Data

Feb. 18, 2000 (JP) .............................. 2000-041936
Jan. 4, 2001 (JP) .............................. 2001-000020

(51) Int. Cl.
*G06F 1/00* (2006.01)
(52) U.S. Cl. ...................... 358/1.9; 358/505; 358/3.26; 347/238; 347/232
(58) Field of Classification Search ................ 358/1.9, 358/3.26, 505; 347/238, 232
See application file for complete search history.

(56) References Cited

U.S. PATENT DOCUMENTS

| | | | | |
|---|---|---|---|---|
| 5,383,010 A | * | 1/1995 | Sakurai | ....................... 399/300 |
| 5,715,078 A | * | 2/1998 | Shiraishi | ..................... 359/204 |
| 5,754,922 A | * | 5/1998 | Bessho | ......................... 399/52 |
| 6,011,575 A | * | 1/2000 | Haneda | ....................... 347/238 |
| 6,037,964 A | * | 3/2000 | Gomi et al. | ................ 347/238 |
| 6,163,366 A | * | 12/2000 | Okamoto et al. | ............. 355/53 |
| 6,215,512 B1 | * | 4/2001 | Imaizumi et al. | ........... 347/234 |

(Continued)

FOREIGN PATENT DOCUMENTS

JP 9-188000 7/1997

(Continued)

*Primary Examiner*—Twyler Lamb
*Assistant Examiner*—Michael Burleson
(74) *Attorney, Agent, or Firm*—Morrison & Foerster LLP

(57) ABSTRACT

An image forming apparatus using an exposure unit of a solid-scanning type such as an LED head, reads out linear distortion correction data of an LED unit, then, calculates an amount of correcting color deviation based on the read-out data, and after that, carries out address control for color deviation correction memory. Based on this control, the apparatus creates a reference resist patterns, calculates an amount of correcting the color deviation, and writes the calculated amount in the color deviation correction memory. After that, the apparatus reads out the linear distortion correction data, and adds the amount of correcting the color deviation that is determined by sensors, and the amount of the color correction based on the linear distortion correction data, thereby carries out address controls for the color deviation correction memory. This constitution allows correcting linear distortion of the exposure unit itself with ease and accuracy, and correcting positional deviation of the exposure unit occurring during product assembly and deviation in a linear arrangement of an LED head with accuracy.

14 Claims, 13 Drawing Sheets

U.S. PATENT DOCUMENTS

| | | | |
|---|---|---|---|
| 6,249,296 B1 * | 6/2001 | Nemura | 347/138 |
| 6,323,934 B1 * | 11/2001 | Enomoto | 355/40 |
| 6,366,304 B1 * | 4/2002 | Nakayasu et al. | 347/129 |
| 6,381,428 B1 * | 4/2002 | Yamamoto et al. | 399/116 |
| 6,421,508 B2 * | 7/2002 | Inoue et al. | 399/44 |
| 6,559,976 B1 * | 5/2003 | Hirota | 358/3.03 |
| 2002/0149799 A1 * | 10/2002 | Hayashi | 358/406 |
| 2003/0142865 A1 * | 7/2003 | Hirota et al. | 382/167 |
| 2004/0071336 A1 * | 4/2004 | Yui | 382/147 |

FOREIGN PATENT DOCUMENTS

| | | |
|---|---|---|
| JP | 10-293479 | 11/1998 |

* cited by examiner

BOW CORRECTION DATA

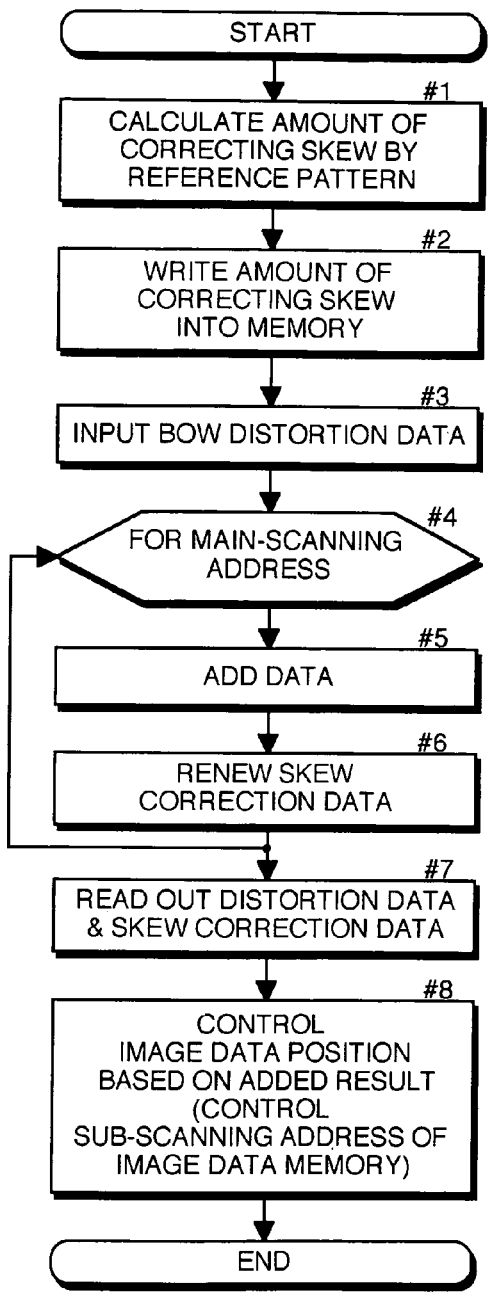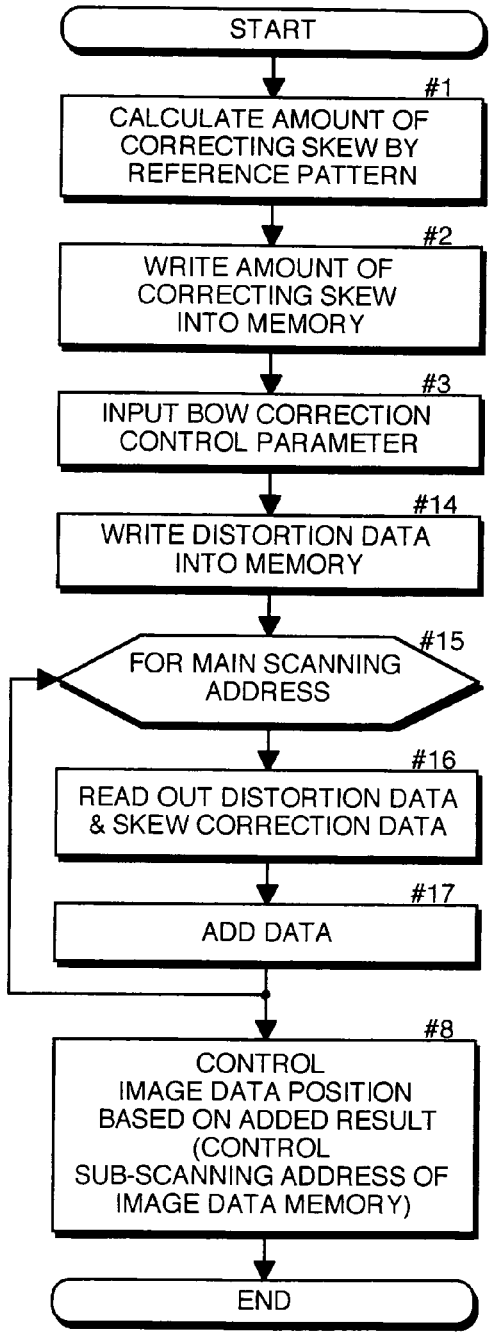

*FIG. 9* DISTORTION DATA INPUT PANEL
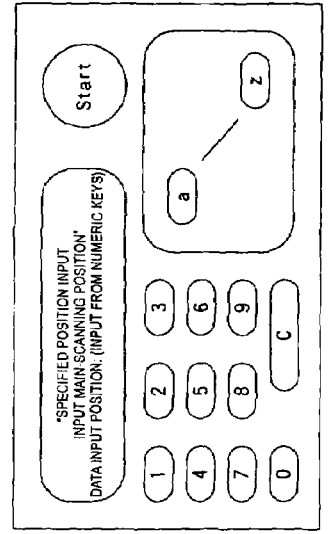
[A: DISTORTION DATA INPUT SCREEN]
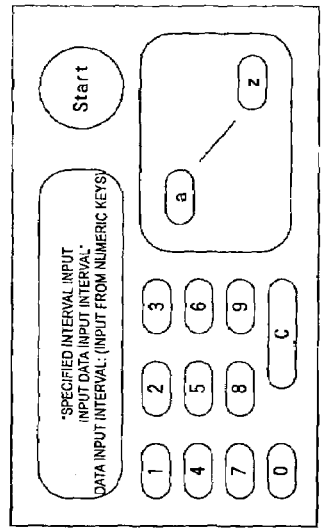
[C: DISTORTION DATA INPUT INTERVAL SCREEN]
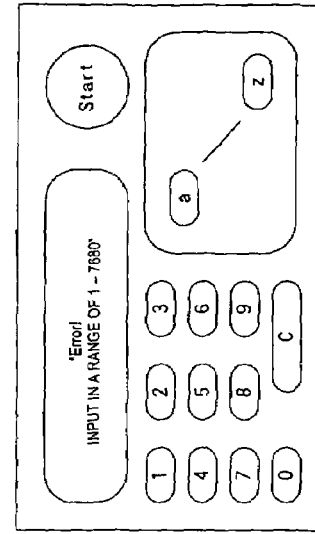
[E: SPECIFIED POSITION INPUT SCREEN]
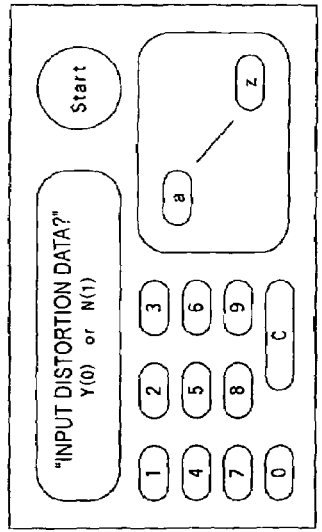
[B: INPUT METHOD SELECTING SCREEN]
(0) → TO C
(1) → TO D
(2) → TO E
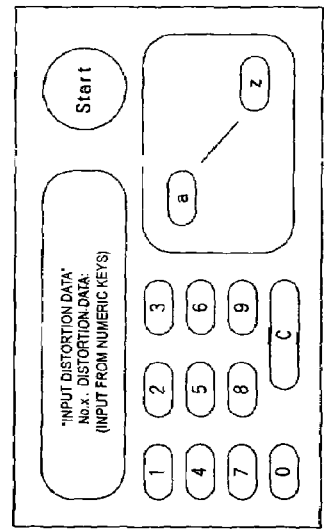
[D: DISTORTION DATA INPUT SCREEN]
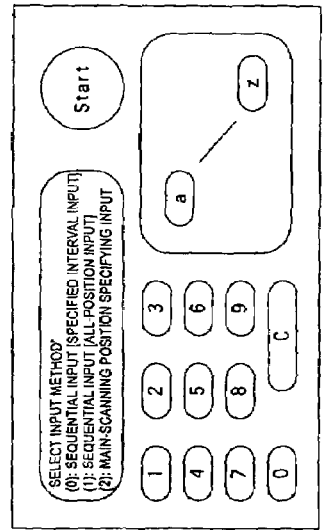
[F: EXAMPLE OF INPUT ERROR]

FIG.11  [AMOUNT OF COLOR DEVIATION IN MAIN SCANNING]
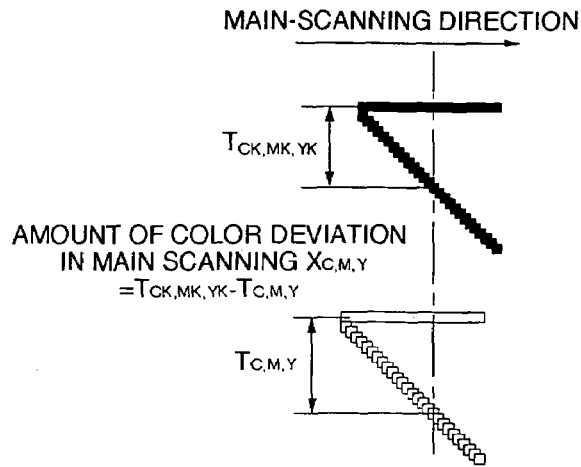
AMOUNT OF COLOR DEVIATION IN MAIN SCANNING $X_{C,M,Y}$
$= T_{CK,MK,YK} - T_{C,M,Y}$
FIG.12  [AMOUNT OF COLOR DEVIATION IN SUB SCANNING]
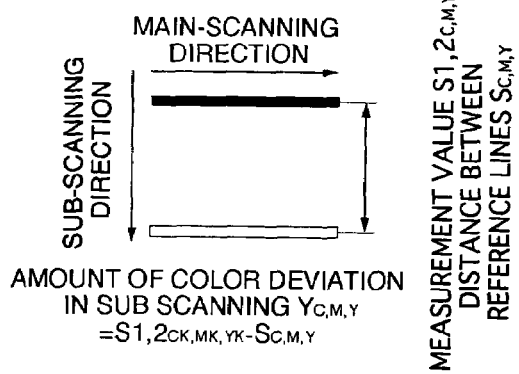
AMOUNT OF COLOR DEVIATION IN SUB SCANNING $Y_{C,M,Y}$
$= S1,2_{CK,MK,YK} - S_{C,M,Y}$
FIG.13
g(Xd): AMOUNT OF COLOR CORRECTION IN SUB SCANNING (dot)
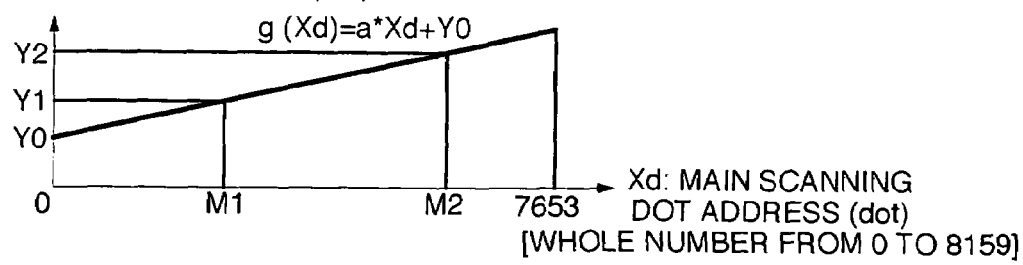
$g(Xd) = a*Xd + Y0$
Xd: MAIN SCANNING DOT ADDRESS (dot)
[WHOLE NUMBER FROM 0 TO 8159]

FIG. 18 PRIOR ART
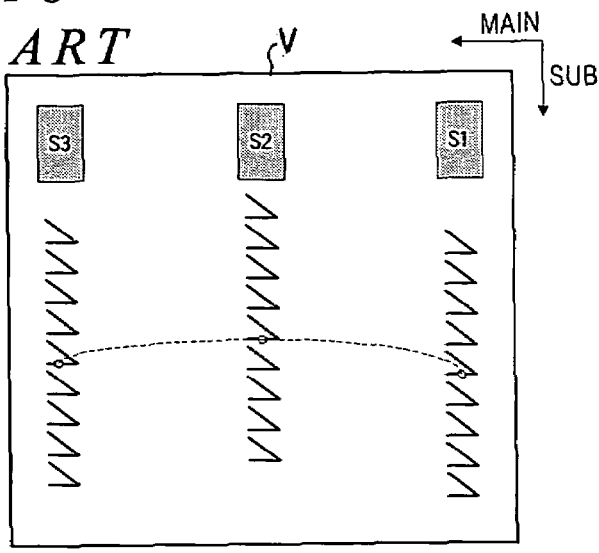
FIG. 19
ELEMENTS OF COLOR DEVIATION
- DEVIATION IN MAIN-SCANNING DIRECTION
- DEVIATION IN SUB-SCANNING DIRECTION
- ANGLE DEVIATION (SKEW)
- DEVIATION IN SCANNING LINE (BOW)
- SCALING RATIO IN MAIN-SCANNING DIRECTION
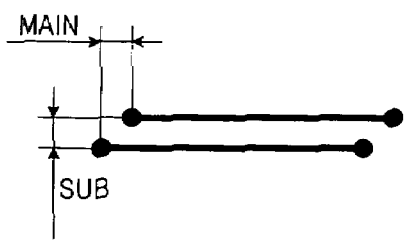
SKEW
BOW
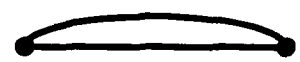
SCALING RATIO
IN MAIN-SCANNING DIRECTION
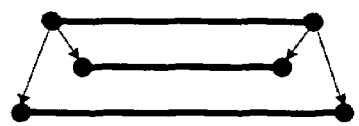

IMAGE FORMING APPARATUS HAVING A FUNCTION FOR CORRECTING COLOR DEVIATION AND THE LIKE

This application is based on Japanese Patent applications Nos.2000-41936 and 2001-20 filed in Japan, the contents of which are hereby incorporated by reference.

BACKGROUND OF THE INVENTION

This invention relates to an image forming apparatus that forms images by means of an electrophotographic process using an exposure unit for exposing an image carrier based on image data.

Conventionally, in an image forming apparatus such as a digital copier, a printer, a facsimile apparatus, there has been known a solid-scanning head (hereinafter referred to as LED head) such as an LED array as an exposure device (exposure unit) for exposing an image to a photoconductor. Compared with an optical-scanning device such as a laser (hereinafter referred to as LD head), the LED head is superior in properties of a smaller number of moving parts, a high degree of reliability and a construction that can be miniaturized, and save spaces. The LED head is driven based on image data generated from document information that is read out by an image reader in the image forming apparatus, or image data that is transmitted from outside of the apparatus, thereby emitting light, exposing the photoconductor, and forming an electrostatic latent image. The electrostatic latent image is developed for forming an image on a sheet.

This kind of the image forming apparatus is desired to produce images without color deviation in color image forming operations. Especially, in a tandem system that images formed in an image forming unit for each of colors are multi-transferred onto single transfer body (such as transfer belt), it is necessary to detect an error between image forming positions of each of units, and to correct the image data. For this purpose, a resist mark or pattern predetermined for each of units is formed on the transfer body, and optically read out by a detector, thereby adjusting the positions.

For example, there has been provided with an art for correcting image positions in a color image forming apparatus using separated LED heads for four colors, as disclosed in Japanese patent application publication No.10-315545 in which the apparatus is comprises sensors for detecting positional deviation, that are located at both sides of the transfer belt thereof, and corrects deviation of colors (CMY) with respect to a reference color (K) based on the detection by the sensors.

Here, referring to FIG. 18, the explanation is given to a method for detecting color deviation in an image forming apparatus using a conventional LED head. The apparatus is equipped with optical sensors S1, S2 and S3 that are located in front, middle and back sides of a transfer belt V in a main-scanning direction (LED scanning direction) in a downstream side from an image forming unit, and the resist determining patterns are formed on the transfer belt V in a sub-scanning direction, wherein each of the sensors determines the resist determining patterns. Each of patterns of black (K), cyan (C), magenta (M) and yellow (Y), consisting of horizontal lines and oblique lines, is formed at a predetermined interval. Then, the pattern images are read out for detecting deviation amounts of the cyan, magenta and yellow image patterns with respect to the reference K image pattern. Based on the detected value, the deviation amounts of C, M and Y with respect to the reference color K is corrected by approximating to a curve of the second order. The correcting method is carried out by storing correcting coefficient data to a memory, and executing control of drawing timing in response to the data. A curve shown in FIG. 18 indicates curvature (bow) occurring in the image.

It should be noted that, as shown in FIG. 19, elements of the color deviation include deviation in the main-scanning direction, in sub-scanning direction, in angles (skew), scanning lines (bow) and scaling ratio in the main-scanning direction.

The above method for correcting the color deviation by the conventional three-sensor structure, has problems such as (1) the cost increases, (2) the processing system is complicated, (3) approximative errors occur, and (4) if the method is applied to the image forming apparatus using the LED head, linear distortion of the LED exposure unit itself cannot be detected. Further, in the image forming apparatus using the LED head (exposure unit), since bow distortion and deviation in main scaling ratio due to characteristics of optical systems do not occur, only deviation in the main/sub-scanning directions, and skew are required to be corrected, so that correction of color deviation can be corrected by means of a two-sensor structure, that are simple and low cost.

However, the LED exposure unit has a problem of the linear distortion of the LED unit itself caused by distortion (during manufacturing) in linear property of LED arrays (solid scanning exposure device), or distortion during assembly of the exposure unit of the LED arrays. This distortion occurs in a curvature shape, so that the sensor cannot detect it. Besides, the linear distortion in the exposure unit itself may have a curvature profile of the high order, which cannot be handled even by a three-sensor structure. In order to detect such a distortion, greater numbers of sensors are required, which complicates the structure or detection algorithm. As a result, the simple structure cannot have solved the problem of the color deviation caused by the solid scanning exposure device.

SUMMARY OF THE INVENTION

This invention is made to solve the above-mentioned problems. The first object of the present invention is to provide an image forming apparatus capable correcting linear distortion of an exposure unit itself of a solid-scanning type such as an LED head (solid-scanning exposure device) with accuracy and ease, and correcting the distortion and skew with a simple and inexpensive structure, thereby reproducing images without color deviation.

The second object of the present invention is to provide an image forming apparatus capable of correcting positional deviation of a solid scanning exposure device occurring during product assembly, and correcting color deviation caused by arrangement distortion in the linear property of the solid-scanning exposure device with accuracy.

In order to achieve the above-mentioned objects, according to one aspect of the present invention, an image forming apparatus comprises: an exposure unit which exposes an image carrier by emitting light of light emitting elements based on image data; an input device for inputting distortion data of the exposure unit; and a controller which controls an exposure position of an image to be exposed by the exposure unit, based on the input distortion data.

According to another aspect of the present invention, an image forming unit comprises: an exposure unit which exposes an image carrier by emitting light of light emitting elements based on image data; a transfer unit which transfers a latent image created on said image carrier as a revealed image onto a transfer body; an input device for inputting distortion data of the exposure unit; at least two optical sensors which read out resist patterns formed on said transfer body; a data processor which forms skew correction data based on a relative deviation amount in main and sub scanning directions of the exposure unit, that is obtained by a readout of the resist patterns by the optical sensors; and a controller which controls an exposure position of an image by the exposure unit, based on the distortion data input in the input device and skew correction data.

According to a further aspect of the present invention, an image forming apparatus comprises: an exposure unit which exposes a recording medium by emitting light of light emitting elements based on image data, thereby forming an image; a memory device which stores distortion data of the exposure unit; a resist pattern forming device which forms resist patterns on the recording medium; sensors which read out the resist patterns formed by the resist pattern forming device; and a controller which determines recording positional deviation data of the exposure unit based on the read-out result of the resist patterns by the sensors, and controls exposure positions of the image to be exposed by the exposure unit based on the recording positional deviation data and distortion data.

BRIEF DESCRIPTION OF THE DRAWINGS

FIG. 7 is a flowchart showing a processing procedure of the circuit shown in FIG. 3;

FIG. 8 is a flowchart showing a processing procedure of the circuit shown in FIG. 4;

FIG. 9 is a view showing a structure of distortion data input panel and its operation procedure according to one embodiment of the present invention;

FIG. 11 is a view explaining a method of detecting the amount of the color deviation in the main scanning according to one embodiment of the present invention;

FIG. 12 is a view explaining a method of detecting the amount of the color deviation in the sub scanning according to one embodiment of the present invention;

FIG. 13 is a view showing an equation of a relation between main-scanning dot addresses and the amount of the color deviation in the sub scanning according to one embodiment of the present invention;

FIG. 18 is a view explaining a method of detecting color deviation in a conventional image forming apparatus; and FIG. 19 is a view explaining elements of the color deviation.

DETAILED DESCRIPTION OF THE PREFERRED EMBODIMENT OF THE PRESENT INVENTION

Figure 1:
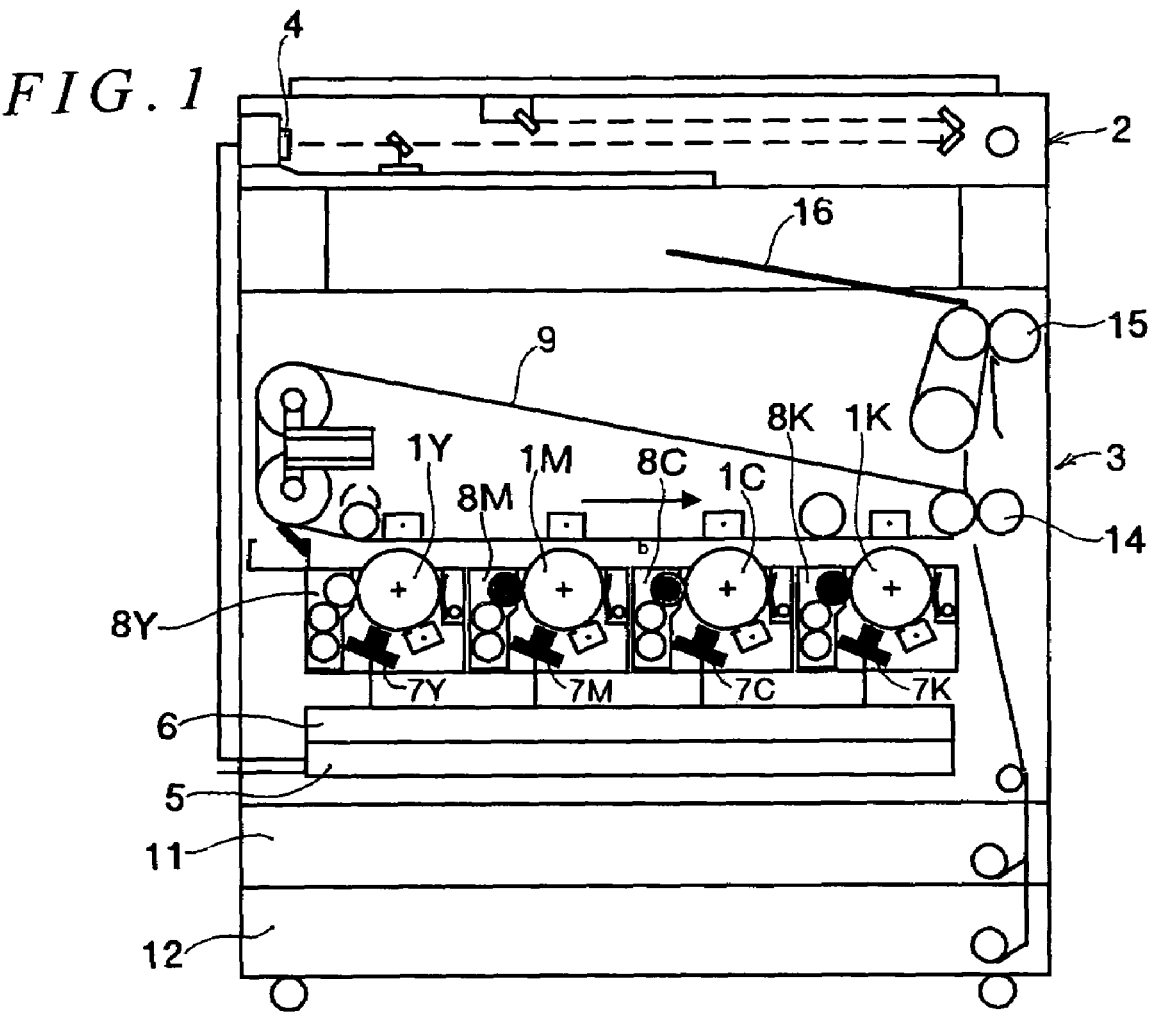
FIG. 1 is a view showing an image forming apparatus according to one embodiment of the present invention.

Now, an image forming apparatus according to one embodiment of the present invention will be explained with reference to the drawings. As shown in FIG. 1, the image forming apparatus is a digital full-color copier (hereinafter simply referred to as copier) in a tandem system, having photoconductor drums 1Y, 1M 1C and 1K for respectively forming images of yellow (Y), magenta (M), cyan (C) and black (K). The copier comprises an image reader 2 for reading out image data of a document, and a printer 3 for printing images on a sheet of paper. The image reader 2 is provided with a scanner having a full-color CCD sensor 4 for converting light reflected from the document into electrical signals (analog signals) of red (R), green (G) and blue (B), and then converts the analog signals into digital signals, thereby outputting the signals into an image signal processor 5 that is provided in the printer 3.

The image signal processor 5 generates digital image signals which have been converted into colors of cyan (C), magenta (M), yellow (Y) and black (K), and drives print heads for each of colors through a driver 6 based on the signals.

Figure 2:
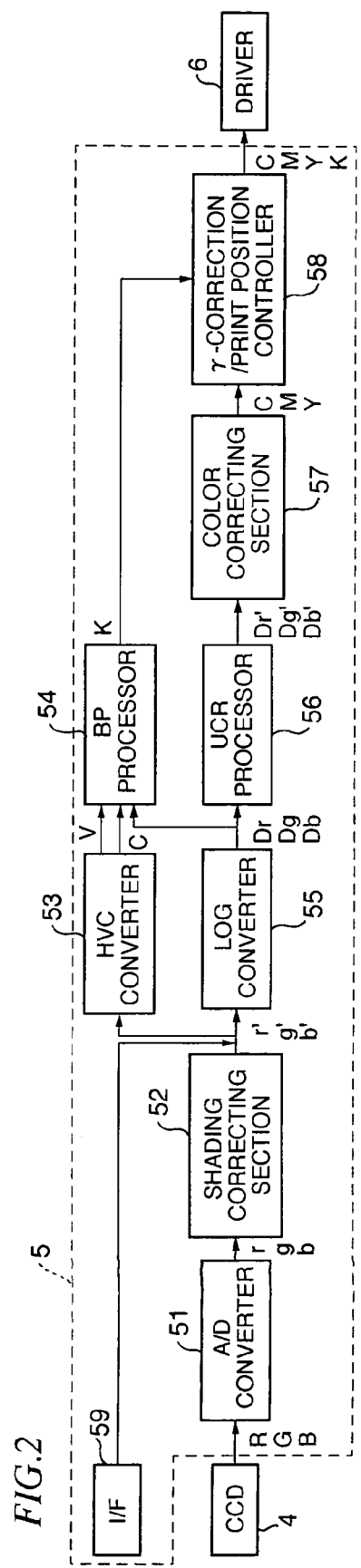
FIG. 2 is a block diagram showing an example of image signal processor of the above image forming apparatus.

Referring to FIG. 2, an example of the image signal processor 5 is explained. Each of sections in the image signal processor 5 carries out control in response to directions from a CPU included in the processor 5. The image signal processor 5 converts reflected light data of each of R, G and B from the full-color CCD sensor 4 that executed an offset and gain correction, into a multi digital value in an A/D converter 51, and then executes shading correction in a shading correcting section 52. An HVC converter 53 converts the digital value transmitted from the shading correcting section 52, into brightness value (V) and chroma (C), and transmits it to a BP (black point) processor 54. Further, a LOG converter 55 converts the digital value transmitted from the shading correcting section 52 into density data, and transmits it to the BP processor 54 and a UCR (under color removal) processor 56. Based on the brightness value data, chroma data, and density data the BP processor 54 and UCR processor 56 calculate common data of R, G and B data as black data in order to improve black reproduction, and at the same time, subtract the black data from the R, G and B data. Each of R, G and B data from which the black data has been subtracted, is transmitted to a color correcting section 57, and converted into signals of C, M and Y, then transmitted to a γ-correction/print position controller 58. The γ-correction/print position controller 58 carries out γ-correction that is a signal conversion processing for approximating recorded density to lineation for the C, M, Y and K signals transmitted from the color correcting section 57 and BP processor 54, and later-explained print position correcting processing, and then transmits the corrected signals of C, M, Y and K into the driver 6 for driving the print head. Based on the transmitted signals, the driver 6 writes in a latent image of each of colors by the print head. An interface 59 makes connections with an external apparatus.

The print head comprises LED arrays 7Y, 7M, 7C and 7K (exposure units in a solid-scanning type) composed of numbers of optical chips arranged in the main-scanning direction. The LED arrays are stored in a process cartridge including the photoconductor drums 1Y, 1M, 1C and 1K for forming images of each of colors.

Light from the LED arrays 7Y, 7M, 7C and 7K of the print heads exposures the photoconductor drums 1Y, 1M, 1C and 1K, and forms an electrostatic latent image for each of colors Y, M, C and K. The electrostatic latent image of each of colors is developed by developing devices 8Y, 8M, 8C and 8K for each of colors, that are respectively provided in process cartridges for each of colors. A toner image of each of colors on the photoconductor drums 1Y, 1M, 1C and 1K is sequentially transferred to a transfer belt 9, for forming an image in which each of colors is superimposed. The superimposed image is sent to a transfer position to a sheet by a movement of the transfer belt 9. The sheet contained in paper-feeding cassettes 11 and 12 is transmitted to the transferring position in synchronization with the image on the transfer belt 9, and the image on the transfer belt 9 is re-transferred by a secondary transfer roller 14. The toner image on the sheet is fixed by a fixing roller 15, then the sheet is discharged into a tray 16.

The above copier includes two optical sensors (S1 and S2 in later-described FIG. 10) that are arranged in a line in a scanning direction of the LED array in a downstream side from each of the process cartridges on the transferring belt 9, to thereby form predetermined resist pattern images of plural colors as necessary, wherein the optical sensors read out the resist patterns. Based on the read-out result and input data, an image signal processor 5 creates data for correcting image data, and carries out correcting processing for image data transmitted to the LED arrays.

Figure 3:
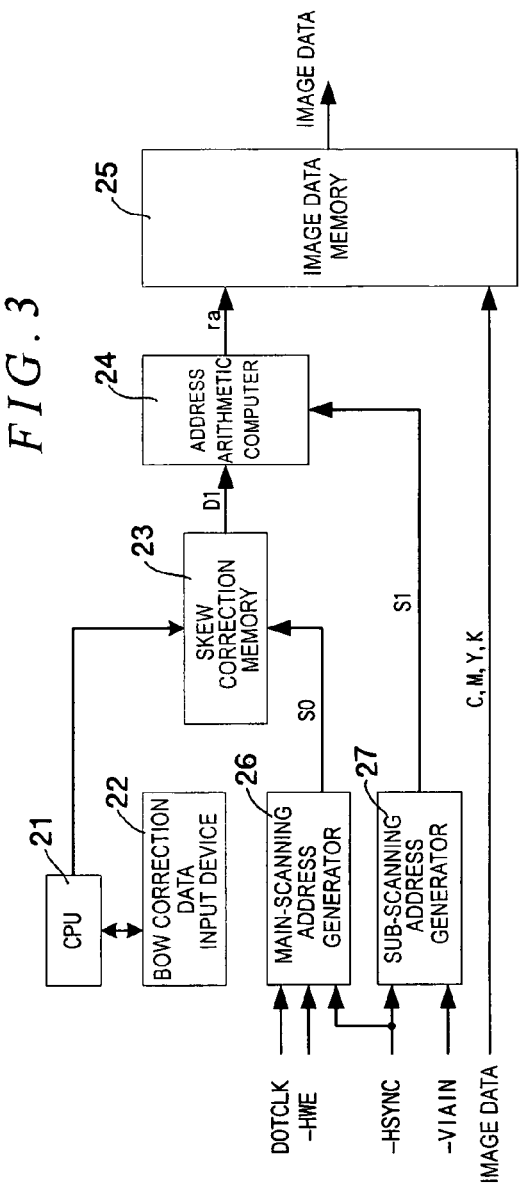
FIG. 3 is a block diagram showing one example of an image data correcting processor of the above apparatus.

FIG. 3 shows an example of the print position control in the γ-correction/print position controller 58 (hereinafter referred to as correcting processor of the image data) in the image signal processor 5 according to the present invention. In the figure, the correcting processor comprises a CPU 21, a data input device 22 (concretely, corresponding to an input panel shown in FIG. 9), a skew correction memory 23, an address arithmetic computer 24 and a data memory 25. The CPU 21 directs the correcting processing. The data input device 22 inputs linear-distortion data of the exposure unit, that is, bow-distortion data, which has previously been determined. The skew correction memory 23 stores skew correction data that is created based on the input data and a determined result of the resist patterns that are read out by the sensors. The address arithmetic computer 24 calculates a corrected exposure (drawing) position of pixels. Besides, the correction processor is provided with a main-scanning address generator 26 and a sub-scanning address generator 27. "DOTCLK" means a dot-clock signal, "_HWE" a write-enable signal, "_HSYNC" a horizontal synchronous signal, and "_VIAIN" a vertical synchronous signal. As to image data, each of C, M, Y and K data is input. In this constitution, the CPU 21 (corrected data generator, exposure position controller) performs arithmetic computation, to thereby determine a relative amount of deviation about the main and sub scanning directions of the exposure unit, and renew skew correction data that is stored in the skew correction memory 23.

Figure 4:
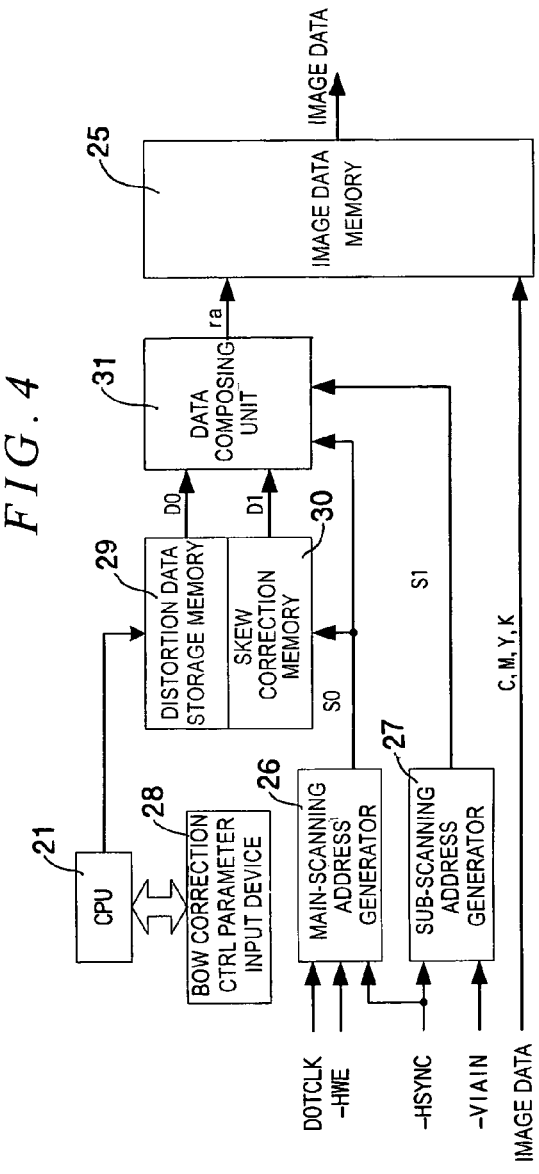
FIG. 4 is a block diagram showing alternative example of the correcting processor.

FIG. 4 shows a modified example of the correcting processor according to the present invention. In the figure, it is to be noted that the same or similar components as those of the above embodiment are denoted by the same reference numerals. As shown in the figure, the CPU 21, which is connected with a bow-correction control parameter input device 28, comprises a data storage memory 29 and a skew correction memory 30. The data storage memory 29 stores distortion data which is obtained for every pixel by arithmetic computations based on the input from the bow-correction control parameter input device 28. The skew correction memory 30 stores skew correction data which is obtained for every pixel by arithmetic computations based on the determining result of the resist patterns. This correction processor is provided with a data composing unit 31 instead of the address arithmetic computer 24, thereby adding each of data stored in the distortion data storage memory 29 and skew correction memory 30 in order to calculate the corrected exposure (drawing) position of the pixels.

Figure 5:
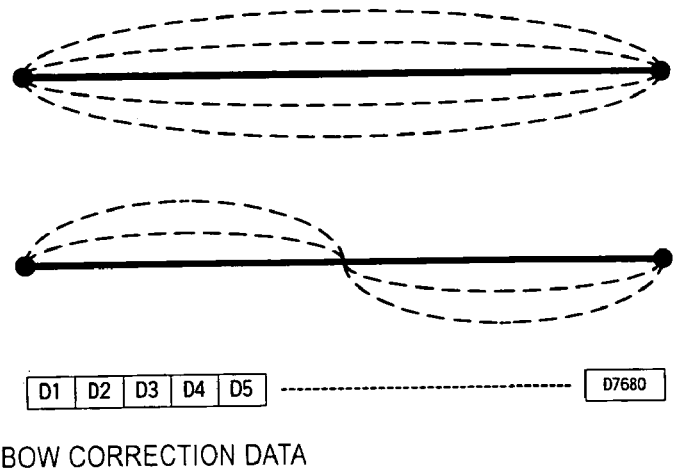
FIG. 5 is a view showing bow distortion and correction data thereof according to one embodiment of the present invention.
Figure 6:
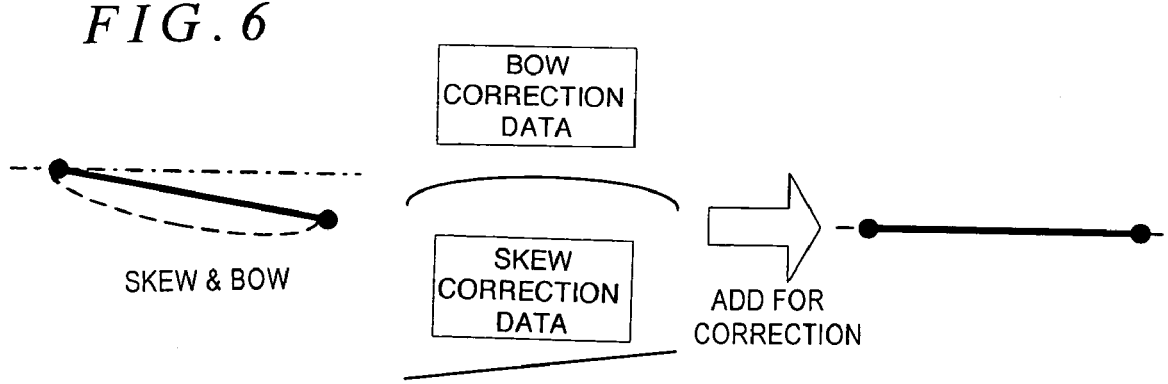
FIG. 6 is a view showing a method of correcting processing when skew and bow occur according to one embodiment of the present invention.

Here, the bow distortion and correction data thereof are shown in FIG. 5, and a method of correcting processing for the bow and skew is shown in FIG. 6. As to the bow correction data, an amount of correction (D1, D2, D3 . . . D7680) for every address of each of pixels in the LED arrays is input in a temporal memory in the CPU 21 in response to a condition of the bow (in FIG. 3), or held in the distortion data storage memory 29 (FIG. 4). As to the correction of the image data, the image with no distortion is formed by adding the memorized bow-correction data and the created skew-correction data to the image data.

FIG. 7 is a flowchart showing a processing procedure of the CPU 21 illustrated in above FIG. 3. In this processing, the CPU 21 first calculates the amount of correcting skew by determining the reference resist pattern (#1), writes the skew correcting amount into the memory 23 (#2), and inputs linear-distortion data of the exposure unit, that is, the bow distortion data (#3). Then, according to the address in the main-scanning direction output from the main-scanning address generator 26 (#4), the CPU 21 adds above two kinds of data (#5), and renews the skew correction data (#6). After that, the CPU 21 reads out the skew correction data to which the distortion data is added (#7), and executes control of the image data position (control of sub-scanning address of the image data memory) based on the result of the adding operation (#8).

FIG. 8 is a flowchart showing a processing procedure of the CPU 21 illustrated in above FIG. 4. It is to be noted that the same or similar processing as those of the above are denoted by the same step numbers. In this processing, the CPU 21 first calculates the amount of correcting skew by the reference resist pattern (#1), writes the skew correcting amount into the memory 30 (#2), and inputs bow-correction control parameter (#3). Then, the CPU 21 writes the distortion data in the memory (#14), and, according to the address in the main-scanning direction output from the main-scanning address generator 26 (#15), reads out the distortion data and skew correction data (#16). After that, the CPU 21 adds these data in the data composing unit 31 (#17), and then, the procedure goes to #8.

FIG. 9 shows construction of a distortion data input panel composing the above data input devices 22 and 28, and shows its operation procedure. In the figure, panel screens are illustrated in time sequence, wherein [A] is a distortion data input screen, [B] a input method selecting screen, [C] a distortion data input interval screen, [D] a distortion data input screen, [E] a specified position input screen, and [F] an error example screen. The panel transits to the proper screen in response to the input method selected by a user. When the distortion data input mode is selected, the distortion data input screen A is first displayed in the display panel. Here, the user enters "0" through a numeric keypad for inputting the distortion data, thereby displaying the input method selecting screen B. As to continuous input operations, the user enters "0" for a specified interval input operation, enters "1" for an all-position input operation, and enters "2" for a main-scanning position specifying operation. For each of the inputs, the screen changes into the C, D or E state. In the distortion data input interval screen C, an interval between data inputs is input. After that, the screen changes into the D state. In the distortion data input screen D, a distortion data number is input. In the specified position input screen E, a data input position is input. After that, the screen changes into the D state. Executing the predetermined number of the above input operations allows the distortion data input. The input position is within a range of the number of dots in one line, but if it exceeds the range, the operation is considered to be an error input, and the screen F is displayed.

The above input distortion data of the exposure unit (LED array) is previously obtained by an arbitrary method. Concerning the concrete arbitrary method, there are several methods such as a method of getting a profile in which focusing is obtained by a measuring device of a separate camera etc. with illuminating all of the elements on one line of LED arrays, a method of forming an image (printing) with exposing one line and judging the amount of the distortion based on the printed result, or a case that the distortion data is found by the data of the device. Besides, the processing of detecting the amount of the correction, writing in the memory, inputting data and the like can be executed in proper timing such as a timing of turning on the power or an initial adjustment at a shipment of the apparatus.

Figure 10:
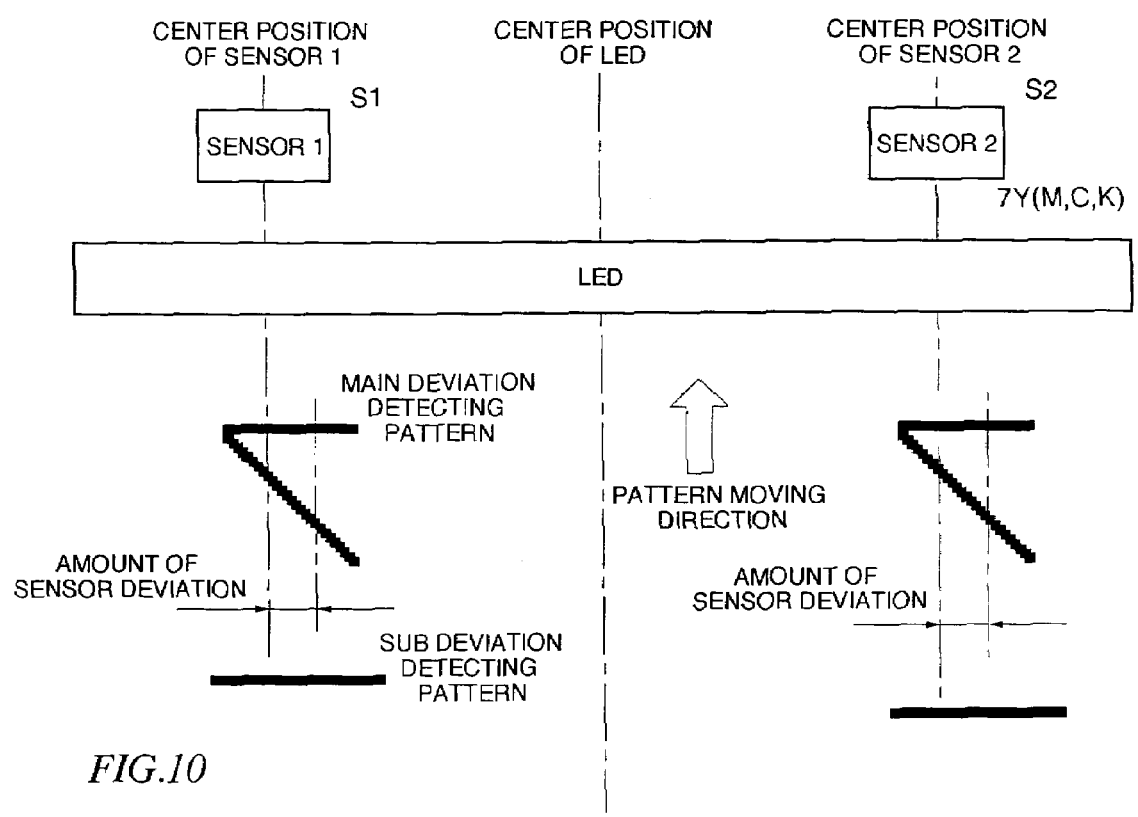
FIG. 10 is a view showing a structure for detecting an amount of color deviation in main/sub scanning according to one embodiment of the present invention.

FIGS. 10-12 are views indicating a structure for detecting an amount of color deviation in the main and sub scanning directions by a determination about the read-out resist patterns with using two sensors, and indicating the detecting method. A sensor 1 (S1) and a sensor 2 (S2) are provided in positions that keep a certain distance from each other to a center of the LED array 7Y (7M, 7C and 7K) in the main scanning direction. Each of the resist patterns for detecting main deviation and for detecting sub deviation is sequentially printed on a transferring belt corresponding to each of sensors at a predetermined interval in a pattern-moving direction for reference color K and other colors Y, M and C (an example is illustrated only about the reference color in FIG. 9). The pattern for detecting the main deviation is composed of horizontal lines and oblique lines, whereas the pattern for detecting the sub deviation is composed of horizontal lines. The sensors detect an amount of relative color deviation of each of color patterns to the reference color pattern (It is to be noted that the pattern deviation to the center positions of the sensors is compensated by below-explained detection of a deviation amount).

As shown in FIG. 11, the amount of the main scanning color deviation corresponds to difference between a time interval (or distance) of reading out the horizontal line and oblique line of the reference color, and a time interval (or distance) of reading out the horizontal line and oblique line of the other colors. Besides, as shown in FIG. 12, the amount of the sub scanning color deviation corresponds to difference from a determined distance (or time) in the sub scanning direction of the horizontal line of the reference color and the horizontal line of the other colors, to a distance (or time) between the reference lines. In both of the above cases, the amount of the color deviation is detected on a pixel-by-pixel basis. Further, if each of the colors is deviated with respect to the reference color in the minus direction of the main scanning and sub scanning, the amount of the color deviation is decided to be minus value.

Based on the main-scanning addresses of two points that are obtained by the determination of the above two sensors, and the amount of sub-scanning color deviation in these addresses, an equation (approximate to a line of the primary order about the amount of correcting sub-scanning skew) between the main-scanning dot address and the amount of sub-scanning color deviation in whole one line can be derived. The outline of it is shown in FIG. 13. In the figure, a horizontal line Xd indicates main dot addresses (dot), a vertical line g (Xd) the amount of sub-scanning color deviation (dot), M1 and M2 main-scanning dot addresses corresponding to sensor positions, and Y1 and Y2 the amount of sub-scanning color deviation in said addresses (a relative equation is given for each of colors with respect to the reference color). The equation of a line of the primary order between these two points is represented below. The relative equations are determined for Y, M and C, and stored into the memory (memory 23 in FIG. 3, and memory 30 in FIG. 4).

$$g(Xd)=a*Xd+Y0$$

in this equation, inclination: $a=(Y1-Y2)/(M1-M2)$ intercept: $Y0=-a*M1+Y1$

The image forming apparatus of the present embodiment adjusts the exposure positions by adding the skew correction data created by the sensor detection of the resist patterns, and the distortion data input from the operation panel as the data input device, which makes it possible to correct the deviation of the positions in the main and sub scanning directions occurring during assembly of the LED exposure unit, and skew by means of the sensor detection, and at the time, to correct the distortion of the exposure unit itself that cannot be detected by the sensor, with the input data, thereby allowing the reproduction of the image without color deviation.

Figure 14:
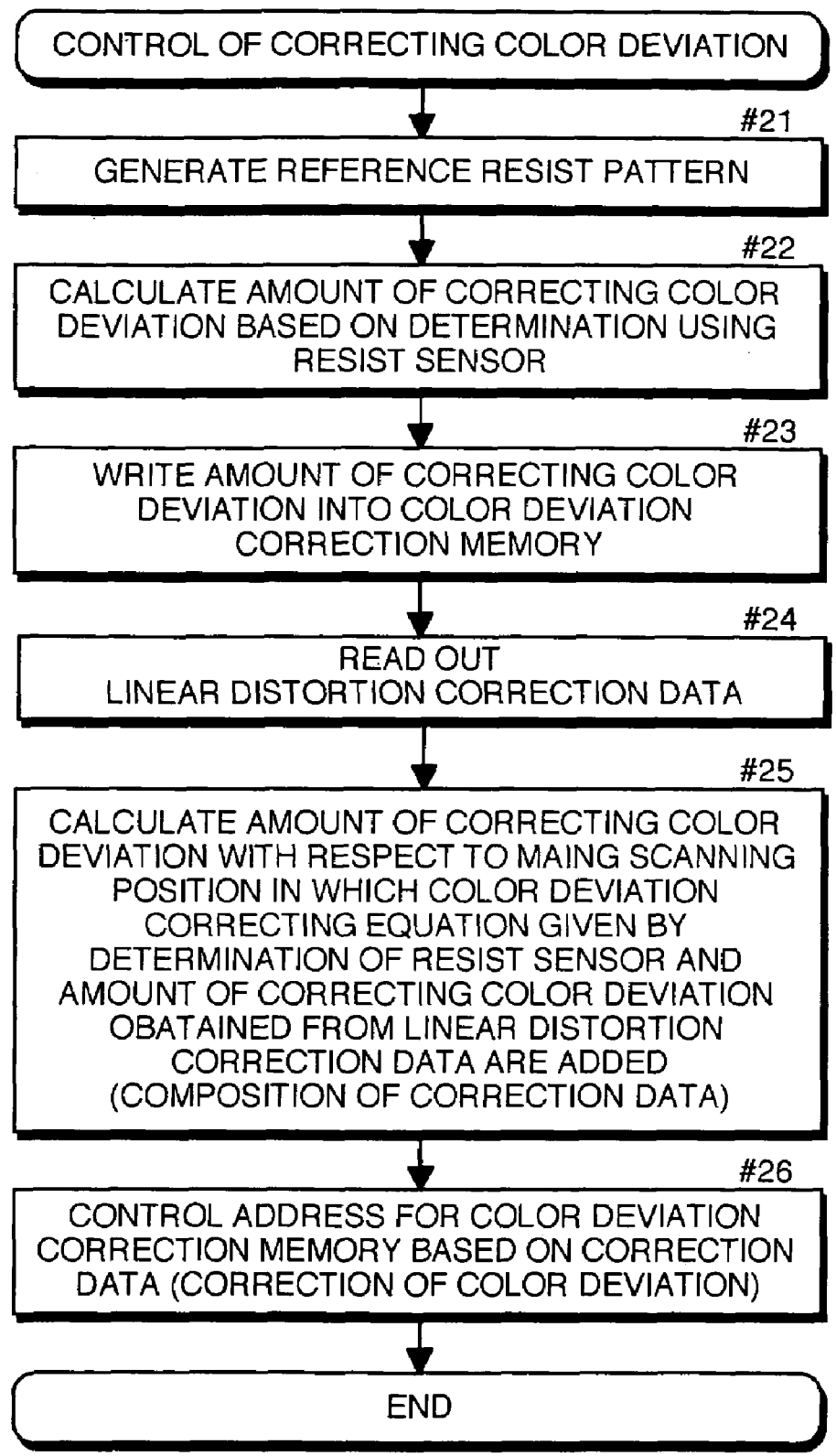
FIG. 14 is a flowchart of control for correcting the color deviation according to the above embodiment of the present invention.

The control of the color deviation in the present embodiment is also shown in a flowchart of FIG. 14 (substantially equal to FIGS. 7 and 8). In the control of correcting the color deviation, an equation for correcting the color deviation calculated by the determination of the optical sensor (resist sensor), and the amount of correcting the color deviation with respect to the main-scanning position to which the amount of color deviation obtained from the LED linear distortion correction data, are calculated (#25), and then address control is executed for the color deviation correction memory (#26). In this correction control, the resist pattern for correcting the color deviation is formed and determined with including the linear distortion of the LED unit (solid scanning exposure device) occurring the product assembly, and the correction data is determined thereafter, so that the enhancement for correcting the color deviation is limited. Therefore, contrasted with the above, referring nextly to FIGS. 15-17, the explanation is given to an embodiment that the resist patterns for correcting the color deviation are created after correcting the linear arrangement of the LED unit for enhancing an accuracy of correcting the color deviation.

Figure 15:
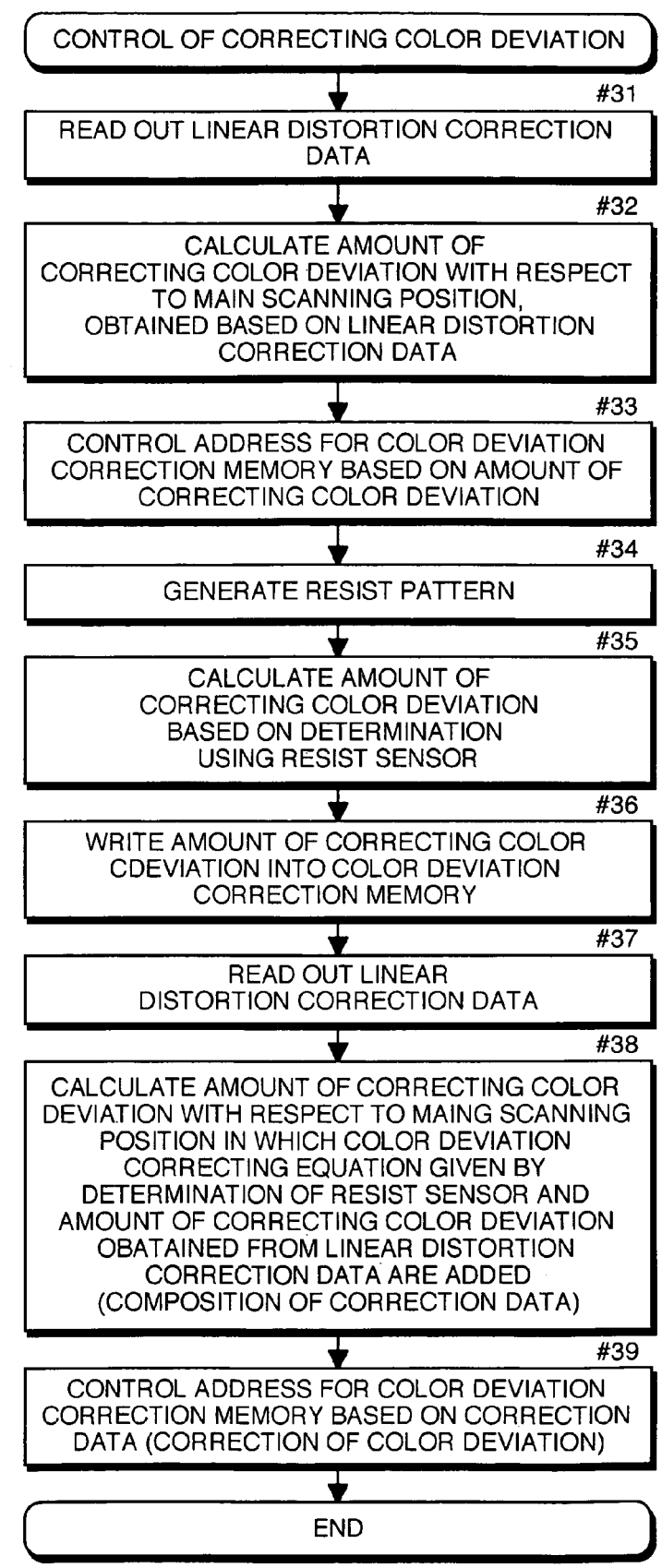
FIG. 15 is a flow chart of control for correcting the color deviation according to an alternative embodiment of the present invention.

FIG. 15 is a flowchart for correcting the color deviation. Data for correcting the linear distortion of the LED unit is first read out (#31), then, the amount of correcting the color deviation with respect to the main-scanning position is calculated based on the amount of the color deviation obtained from said correction data (#32), and after that, the address control is performed for the color deviation correction memory based on the amount of correcting the color deviation (#33). The reference resist patterns are formed by this control (#34), the amount of correcting the color deviation is calculated based on the determination employing the resist sensors (#35), and then, the amount of correcting the color deviation is again written in color deviation correction memory (#36). After that, the linear deviation correction data is read out (#37), and the amount of correcting the color deviation with respect to the main-scanning position that the equation for correcting the color deviation obtained from the determination employing the above resist sensor, and the amount of color deviation obtained from the linear deviation correction data are calculated (#38). The address control is lastly executed for the color deviation correction memory based on the correction data (#39).

Figure 16A:
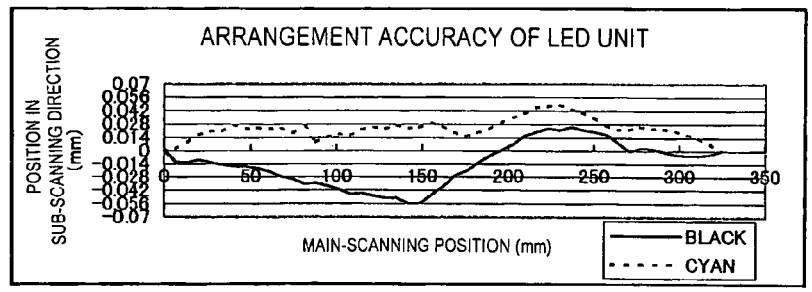
FIGS. 16(a)-16(d) are views conceptually explaining the amount of correcting the color deviation obtained from linear distortion correction data of an LED unit according to one embodiment of the present invention.
Figure 16B:
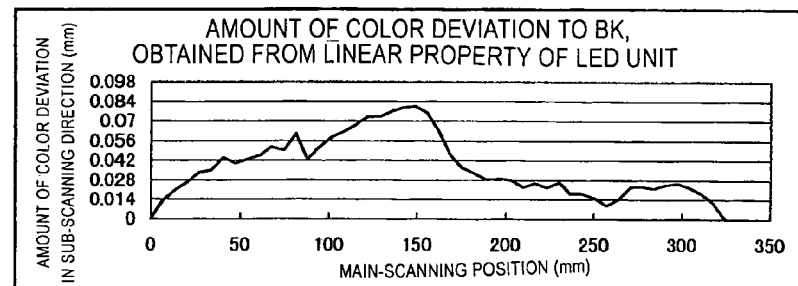
Figure 16C:
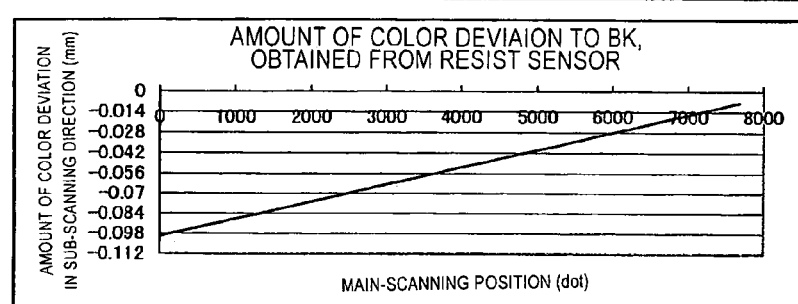
Figure 16D:
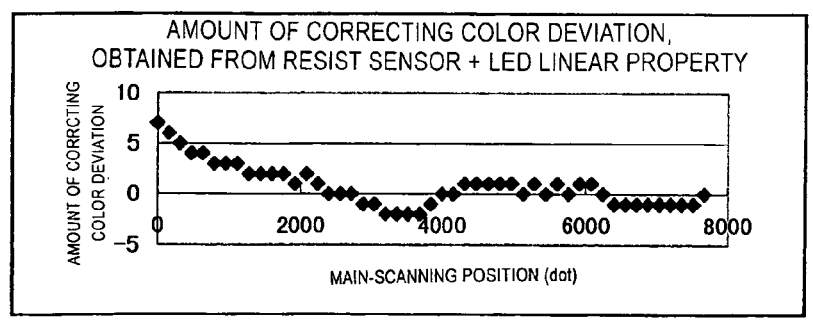

FIGS. 16(a)-16(d) concern the amount of correcting the color deviation obtained from the linear distortion correcting data of the LED unit, and all of them show positions of the sub-scanning direction with respect to the main-scanning position. FIG. 16(a) shows an accuracy of the arrangement of the LED unit, and concerns black and cyan. This data corresponds to the linear distortion correcting data read out in the above S11. FIG. 16(b) shows the amount of the color deviation with respect to black (BK) obtained from the linear property of the LED unit. FIG. 16(c) shows the amount of the color deviation with respect to black (BK) obtained from the resist sensors. FIG. 16(d) shows the amount of correcting color deviation obtained from the resist sensor and a linear property of the LED unit. The amount of correcting the color deviation corresponds to the amount obtained in the above #38.

Figure 17:
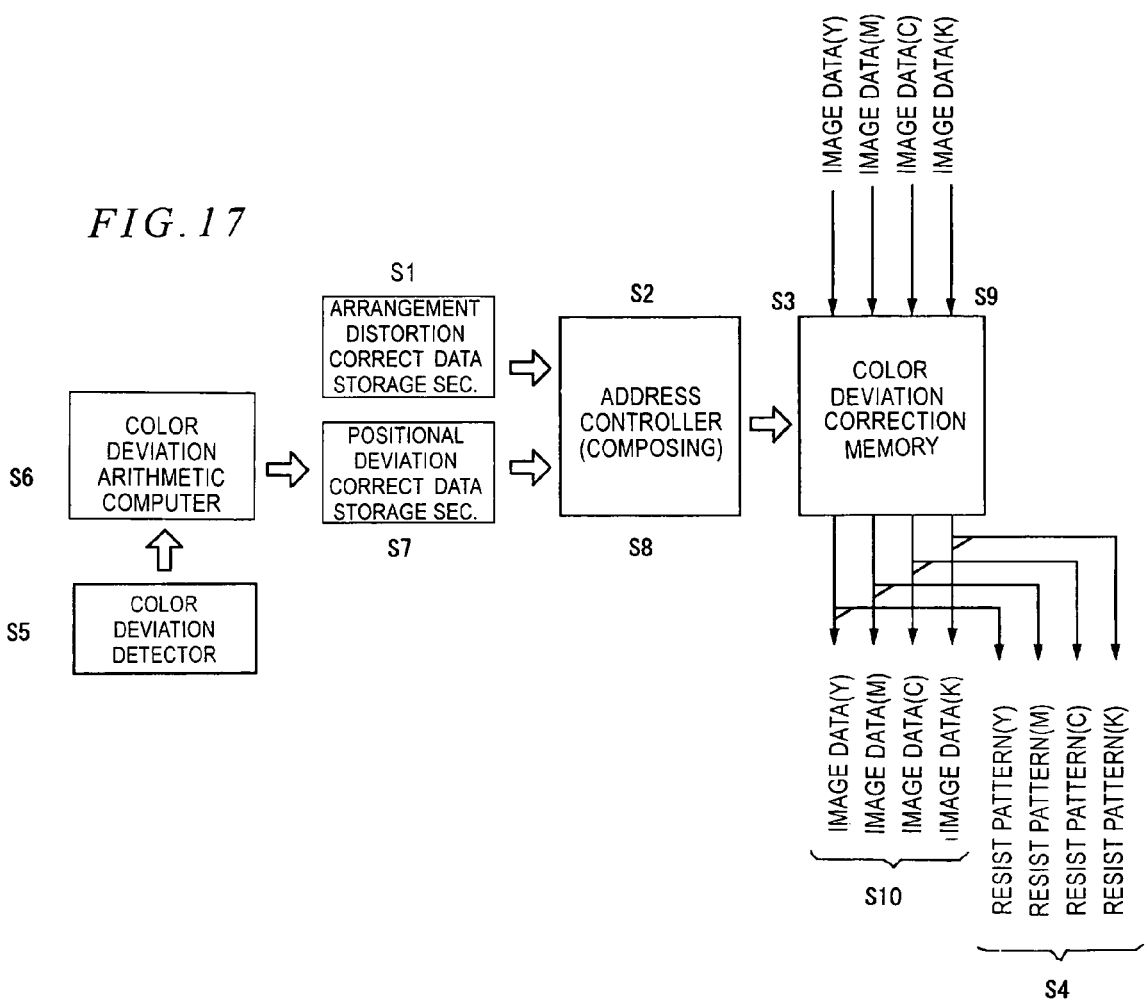
FIG. 17 is a block diagram including the processing of correcting color deviation according to one embodiment of the present invention.

FIG. 17 shows a block diagram for performing the color deviation correction processing, wherein the procedures of the correction processing are represented by S+numbers. A storage section of arrangement distortion correction data (S1) corresponds to the storage memory 29 for the distortion data input through the CPU 21 from the input device 28 of FIG. 4, and the address controller (S2) corresponds to the data composing unit 31. A color deviation correction memory (S3) corresponds to the image data memory 25. The S1, S2 and S3 perform the procedures #31, #32 and #33 of FIG. 15. Resist patterns (S4) are obtained by carrying out the procedure #34. Color deviation detectors (S5) correspond to the resist sensors, color deviation arithmetic computer (S6) to CPU 21 (controller in claims), and a storage section of positional deviation correction data (S7) to the skew correction memory 30. S5, S6 and S7 perform the procedures #35 and #36, and S8, S9 and S10 perform the procedures #37, #38 and #39. The color deviation correction memory corresponds to image memory device for storing image data in claims.

The above color deviation correction processing creates the resist patterns on the transfer belt by the resist pattern forming device after correcting the arrangement distortion of the LED unit with using the input distortion data, relatively detects the positional deviation of the image of the other exposure unit with respect to the image of the exposure unit as a reference, and performs the address control for the image memory device in order to eliminate the deviation of the image position based on the detected result.

The above color correction processing creates the resist patterns in a state that each of linear arrangement deviation of the LED unit is eliminated, thereby creating the resist patterns for detecting the positional deviation, and corrects the color deviation based on the determined result, which makes it possible to correct the positional deviation of the exposure unit occurring during the product assembly, and enhance the accuracy of correcting the color deviation of the image.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. Although the above embodiment shows the example that the exposure position is adjusted by adding the skew correcting data created based on readout of the resist patterns by the sensors, and the distortion data of the exposure unit input from the input device, the present invention is also capable of coping with the distortion that cannot be detected by the sensor even in the case of adjusting the exposure position based on the distortion data of the exposure unit input from the data input device. Besides, the above embodiment shows the example that the sensor reads out the resist patterns formed on the transfer belt, but it is also possible to print resist patterns on a sheet by the printer 3 of FIG. 1, and to read out the resist patterns by a scanner using the full-color CCD sensor 4 of the image reader 2.

What is claimed is:

1. An image forming apparatus comprising:
    an exposure unit which exposes an image carrier by emitting light of light emitting elements based on image data;
    an input device for inputting distortion data of the exposure unit; and
    a controller which controls an exposure position of an image to be exposed by the exposure unit, based on the input distortion data,
    wherein the input device is an operation panel operated by a user.

2. The image forming apparatus according to claim 1, wherein the exposure unit includes a plurality of the light emitting elements that are arranged in a line.

3. The image forming apparatus according to claim 2, wherein data corresponding to each of the light emitting elements are input.

4. The image forming apparatus according to claim 1, wherein the input device is equipped with plural kinds of input methods.

5. An image forming unit comprising:
    an exposure unit which exposes an image carrier by emitting light of light emitting elements based on image data;
    a transfer unit which transfers a latent image created on said image carrier as a revealed image onto a transfer body;
    an input device for inputting distortion data of the exposure unit;
    at least two optical sensors which read out resist patterns formed on said transfer body;
    a data processor which forms skew correction data based on a relative deviation amount in main and sub scanning directions of the exposure unit, that is obtained by a readout of the resist patterns by the optical sensors; and a controller which controls an exposure position of an image by the exposure unit, based on the distortion data input in the input device and skew correction data,
wherein the input device is an operation panel operated by a user.

6. The image forming apparatus according to claim 5, wherein the exposure unit includes a plurality of the light emitting elements that are arranged in a line.

7. The image forming apparatus according to claim 6, wherein data corresponding to each of the light emitting elements are input.

8. The image forming apparatus according to claim 6, wherein each of the optical sensors is arranged in a position at a predetermined distance in the main-scanning direction from a center position of the arrangement of the light emitting elements.

9. An image forming apparatus comprising
an exposure unit which exposes a recording medium by emitting light of light emitting elements based on image data, thereby forming an image;
a memory device which stores distortion data of the exposure unit;
a resist pattern forming device which forms resist patterns on the recording medium;
sensors which read out the resist patterns formed by the resist pattern forming device;
a controller which determines recording positional deviation data of the exposure unit based on the read-out result of the resist patterns by the sensors, and controls exposure positions of the image to be exposed by the exposure unit based on the recording positional deviation data and distortion data; and
an input device for inputting the distortion data of the exposure unit, wherein the input device is an operation panel operated by a user.

10. The image forming apparatus according to claim 9, wherein the exposure unit includes a plurality of the light emitting elements that are arranged in a line.

11. The image forming apparatus according to claim 10, wherein data corresponding to each of the light emitting elements are input.

12. The image forming apparatus according to claim 10, wherein each of the sensors is arranged in a position at a predetermined distance in the main-scanning direction from a center position of the arrangement of the light emitting elements.

13. The image forming apparatus according to claim 9,
wherein a plurality of the exposure units are provided for forming color images;
wherein an image storage device for storing image data is further provided; and
wherein the controller corrects linear distortion of the exposure units, using distortion data input from the input device, and then forms the resist patterns on the recording medium by means of the resist pattern forming device, to thereby relatively detect the positional deviation of the images in the exposure units with respect to the image in the reference exposure unit by means of the optical sensor device, and execute address control of the image storage device so as to correct the positional deviation of the images based on the detected result.

14. The image forming apparatus according to claim 9,
wherein the controller corrects linear distortion of the exposure units, and thereafter corrects the positional deviation of the images.

* * * * *